US008219282B2

(12) United States Patent
Lu et al.

(10) Patent No.: US 8,219,282 B2
(45) Date of Patent: Jul. 10, 2012

(54) SYSTEM FOR DYNAMICALLY DETERMINING VEHICLE REAR/TRUNK LOADING FOR USE IN A VEHICLE CONTROL SYSTEM

(75) Inventors: Jianbo Lu, Livonia, MI (US); Keith Mattson, Livonia, MI (US); Joe Meyers, Farmingron Hills, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 12/641,417

(22) Filed: Dec. 18, 2009

(65) Prior Publication Data

US 2010/0106358 A1    Apr. 29, 2010

Related U.S. Application Data

(62) Division of application No. 11/010,863, filed on Dec. 13, 2004, now Pat. No. 7,660,654.

(51) Int. Cl.
    *G06F 7/00* (2006.01)
(52) U.S. Cl. .............. 701/36; 701/46; 701/48; 340/429; 340/440; 280/5.506; 280/5.508; 280/735
(58) Field of Classification Search .................... 701/36, 701/37, 38, 41, 45, 46, 48, 49; 340/429, 340/440; 280/5.506, 5.508, 735
    See application file for complete search history.

(56) References Cited

U.S. PATENT DOCUMENTS

| | | | |
|---|---|---|---|
| 2,525,900 A * | 10/1950 | Hammond | 244/181 |
| 2,917,126 A | 12/1959 | Phillips | |
| 3,604,273 A | 9/1971 | Kwok et al. | |
| 3,608,925 A | 9/1971 | Murphy | |
| 3,797,893 A | 3/1974 | Burckhardt | |
| 3,899,028 A | 8/1975 | Morris et al. | |
| 3,948,567 A | 4/1976 | Kasselmann et al. | |
| 3,972,543 A | 8/1976 | Presley et al. | |
| 4,023,864 A | 5/1977 | Lang et al. | |
| RE30,550 E | 3/1981 | Reise | |
| 4,294,113 A | 10/1981 | Sprott et al. | |
| 4,480,714 A | 11/1984 | Yabuta et al. | |

(Continued)

FOREIGN PATENT DOCUMENTS

DE    36 16 907    11/1987

(Continued)

OTHER PUBLICATIONS

U.S. Appl. No. 10/459,697, filed Jun. 11, 2003, Lu.

(Continued)

*Primary Examiner* — Thomas Tarcza
*Assistant Examiner* — Rami Khatib
(74) *Attorney, Agent, or Firm* — Angela M. Brunetti; Frederick Owens

(57) ABSTRACT

A control system (18) and method for an automotive vehicle (10) includes a pitch rate sensor (37) generating a pitch rate signal, a longitudinal acceleration sensor (36) generating a longitudinal acceleration signal, and a yaw rate sensor (28) generating a yaw rate signal. A safety system (44) and the sensors are coupled to a controller. From the sensors, the controller (26) determines an added mass and a position of the added mass, a pitch gradient and/or a pitch acceleration coefficient that takes into account the added mass and position. The controller controls a vehicle system in response to the added mass and the position of the added mass, the pitch gradient and/or pitch acceleration coefficient variables.

27 Claims, 4 Drawing Sheets

U.S. PATENT DOCUMENTS

| | | |
|---|---|---|
| 4,548,079 A | 10/1985 | Klatt |
| 4,592,565 A | 6/1986 | Eagle |
| 4,597,462 A | 7/1986 | Sano et al. |
| 4,624,476 A | 11/1986 | Tanaka et al. |
| 4,650,212 A | 3/1987 | Yoshimura |
| 4,679,808 A | 7/1987 | Ito et al. |
| 4,690,553 A | 9/1987 | Fukamizu et al. |
| 4,705,130 A | 11/1987 | Fukunaga et al. |
| 4,761,022 A | 8/1988 | Ohashi |
| 4,765,649 A | 8/1988 | Ikemoto et al. |
| 4,767,588 A | 8/1988 | Ito |
| 4,778,773 A | 10/1988 | Sukegawa |
| 4,809,183 A | 2/1989 | Eckert |
| 4,827,416 A | 5/1989 | Kawagoe et al. |
| 4,846,496 A | 7/1989 | Tanaka et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,998,593 A | 3/1991 | Karnopp et al. |
| 5,033,770 A | 7/1991 | Kamimura et al. |
| 5,058,017 A | 10/1991 | Adachi et al. |
| 5,066,041 A | 11/1991 | Kindermann et al. |
| 5,088,040 A | 2/1992 | Matsuda et al. |
| 5,089,967 A | 2/1992 | Haseda et al. |
| 5,097,917 A | 3/1992 | Serizawa et al. |
| 5,136,513 A * | 8/1992 | Sol et al. ............... 701/124 |
| 5,159,553 A | 10/1992 | Karnopp et al. |
| 5,163,319 A | 11/1992 | Spies et al. |
| 5,189,920 A | 3/1993 | Martinez |
| 5,200,896 A | 4/1993 | Sato et al. |
| 5,204,815 A * | 4/1993 | Yamamoto ............... 701/38 |
| 5,208,749 A | 5/1993 | Adachi et al. |
| 5,224,765 A | 7/1993 | Matsuda |
| 5,228,757 A | 7/1993 | Ito et al. |
| 5,230,396 A | 7/1993 | Yasui |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,274,576 A | 12/1993 | Williams |
| 5,278,761 A | 1/1994 | Ander et al. |
| 5,282,134 A | 1/1994 | Gioutsos et al. |
| 5,297,646 A | 3/1994 | Yamamura et al. |
| 5,307,274 A | 4/1994 | Takata et al. |
| 5,311,431 A | 5/1994 | Cao et al. |
| 5,311,956 A | 5/1994 | Sugiyama |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,438,515 A | 8/1995 | Miichi et al. |
| 5,446,658 A | 8/1995 | Pastor et al. |
| 5,455,770 A | 10/1995 | Hadeler et al. |
| 5,490,063 A | 2/1996 | Genise |
| 5,510,989 A | 4/1996 | Zabler et al. |
| 5,515,277 A | 5/1996 | Mine |
| 5,548,536 A | 8/1996 | Ammon |
| 5,549,328 A | 8/1996 | Cubalchini |
| 5,560,688 A | 10/1996 | Schappler et al. |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,684,702 A | 11/1997 | Phillips et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,719,790 A | 2/1998 | Lohrenz et al. |
| 5,720,533 A | 2/1998 | Pastor et al. |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,740,877 A | 4/1998 | Sasaki |
| 5,742,918 A | 4/1998 | Ashrafi et al. |
| 5,742,919 A | 4/1998 | Ashrafi et al. |
| 5,762,406 A | 6/1998 | Yasui et al. |
| 5,782,543 A | 7/1998 | Monzaki et al. |
| 5,787,375 A | 7/1998 | Madau et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,842,143 A | 11/1998 | Lohrenz et al. |
| 5,857,160 A | 1/1999 | Dickinson et al. |
| 5,857,535 A | 1/1999 | Brooks |
| 5,869,943 A | 2/1999 | Nakashima et al. |
| 5,878,357 A | 3/1999 | Sivashankar et al. |
| 5,890,084 A | 3/1999 | Halasz et al. |
| 5,893,896 A | 4/1999 | Imamura et al. |
| 5,925,083 A | 7/1999 | Ackermann |
| 5,931,546 A | 8/1999 | Nakashima et al. |
| 5,941,920 A | 8/1999 | Schubert |
| 5,944,137 A | 8/1999 | Moser et al. |
| 5,944,392 A | 8/1999 | Tachihata et al. |
| 5,946,644 A | 8/1999 | Cowan et al. |
| 5,964,819 A | 10/1999 | Naito |
| 5,971,503 A | 10/1999 | Joyce et al. |
| 6,002,974 A | 12/1999 | Schiffmann |
| 6,002,975 A | 12/1999 | Schiffmann et al. |
| 6,026,926 A | 2/2000 | Noro et al. |
| 6,038,495 A | 3/2000 | Schiffmann |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,133 A | 7/2000 | Keuper et al. |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,121,873 A | 9/2000 | Yamada et al. |
| 6,122,568 A | 9/2000 | Madau et al. |
| 6,122,584 A | 9/2000 | Lin et al. |
| 6,129,172 A | 10/2000 | Yoshida |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |
| 6,161,905 A | 12/2000 | Hac et al. |
| 6,167,357 A | 12/2000 | Zhu |
| 6,169,939 B1 | 1/2001 | Raad et al. |
| 6,169,946 B1 | 1/2001 | Griessbach |
| 6,170,594 B1 | 1/2001 | Gilbert |
| 6,176,555 B1 | 1/2001 | Semsey |
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafi et al. |
| 6,185,497 B1 | 2/2001 | Taniguchi et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |

| | | |
|---|---|---|
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,227,482 B1 | 5/2001 | Yamamoto |
| 6,233,510 B1 | 5/2001 | Platner et al. |
| 6,236,916 B1 | 5/2001 | Staub et al. |
| 6,263,261 B1 | 7/2001 | Brown et al. |
| 6,266,596 B1 | 7/2001 | Hartman et al. |
| 6,272,420 B1 | 8/2001 | Schramm et al. |
| 6,278,930 B1 | 8/2001 | Yamada et al. |
| 6,282,471 B1 | 8/2001 | Burdock et al. |
| 6,282,472 B1 | 8/2001 | Jones et al. |
| 6,282,474 B1 | 8/2001 | Chou et al. |
| 6,290,019 B1 | 9/2001 | Kolassa et al. |
| 6,292,734 B1 | 9/2001 | Murakami et al. |
| 6,292,759 B1 * | 9/2001 | Schiffmann .................. 702/151 |
| 6,311,111 B1 | 10/2001 | Leimbach et al. |
| 6,314,329 B1 | 11/2001 | Madau et al. |
| 6,315,373 B1 | 11/2001 | Yamada et al. |
| 6,321,141 B1 | 11/2001 | Leimbach |
| 6,324,445 B2 | 11/2001 | Tozu et al. |
| 6,324,446 B1 | 11/2001 | Brown et al. |
| 6,324,458 B1 | 11/2001 | Takagi et al. |
| 6,330,522 B1 | 12/2001 | Takeuchi |
| 6,332,104 B1 | 12/2001 | Brown et al. |
| 6,338,012 B2 | 1/2002 | Brown et al. |
| 6,349,247 B1 | 2/2002 | Schramm et al. |
| 6,351,694 B1 | 2/2002 | Tseng et al. |
| 6,352,318 B1 | 3/2002 | Hosomi et al. |
| 6,356,188 B1 | 3/2002 | Meyers et al. |
| 6,360,147 B1 | 3/2002 | Lee |
| 6,363,309 B1 | 3/2002 | Irie et al. |
| 6,370,938 B1 | 4/2002 | Leimbach et al. |
| 6,394,240 B1 | 5/2002 | Barwick |
| 6,397,127 B1 | 5/2002 | Meyers et al. |
| 6,419,240 B1 | 7/2002 | Burdock et al. |
| 6,424,897 B1 | 7/2002 | Mattes et al. |
| 6,427,102 B1 | 7/2002 | Ding |
| 6,428,118 B1 | 8/2002 | Blosch |
| 6,433,681 B1 | 8/2002 | Foo et al. |
| 6,438,463 B1 | 8/2002 | Tobaru et al. |
| 6,438,464 B1 | 8/2002 | Woywod et al. |
| 6,456,194 B1 | 9/2002 | Carlson et al. |
| 6,459,990 B1 | 10/2002 | McCall et al. |
| 6,471,218 B1 | 10/2002 | Burdock et al. |
| 6,477,480 B1 | 11/2002 | Tseng et al. |
| 6,496,758 B2 | 12/2002 | Rhode et al. |
| 6,496,763 B2 | 12/2002 | Griessbach |
| 6,498,976 B1 | 12/2002 | Ehlbeck et al. |
| 6,502,023 B1 | 12/2002 | Fukada |
| 6,504,265 B2 * | 1/2003 | Toda et al. .................. 307/10.8 |
| 6,523,637 B1 | 2/2003 | Nakano et al. |
| 6,526,342 B1 | 2/2003 | Burdock et al. |
| 6,529,803 B2 | 3/2003 | Meyers et al. |
| 6,542,073 B2 | 4/2003 | Yeh et al. |
| 6,542,792 B2 | 4/2003 | Schubert et al. |
| 6,547,022 B2 | 4/2003 | Hosomi et al. |
| 6,553,284 B2 | 4/2003 | Holst et al. |
| 6,554,293 B1 | 4/2003 | Fennel et al. |
| 6,556,908 B1 * | 4/2003 | Lu et al. .......................... 701/38 |
| 6,559,634 B2 | 5/2003 | Yamada |
| 6,593,849 B2 | 7/2003 | Chubb |
| 6,598,946 B2 | 7/2003 | Nagae |
| 6,600,414 B2 | 7/2003 | Foo et al. |
| 6,600,985 B2 | 7/2003 | Weaver |
| 6,618,656 B2 | 9/2003 | Kueblbeck et al. |
| 6,631,317 B2 | 10/2003 | Lu |
| 6,637,543 B2 | 10/2003 | Card |
| 6,644,454 B2 | 11/2003 | Yamada et al. |
| 6,650,971 B2 | 11/2003 | Haas |
| 6,654,674 B2 | 11/2003 | Lu et al. |
| 6,657,539 B2 | 12/2003 | Yamamoto et al. |
| 6,678,631 B2 * | 1/2004 | Schiffmann .................. 702/151 |
| 6,681,196 B2 | 1/2004 | Glaser et al. |
| 6,681,881 B2 | 1/2004 | Andonian et al. |
| 6,698,542 B2 | 3/2004 | Nishizaki et al. |
| 6,704,631 B2 | 3/2004 | Winner et al. |
| 6,718,248 B2 | 4/2004 | Lu |
| 6,719,087 B2 | 4/2004 | Demerly |
| 6,747,553 B2 | 6/2004 | Yamada et al. |
| 6,756,890 B1 | 6/2004 | Schramm et al. |
| 6,799,092 B2 | 9/2004 | Lu |
| 6,816,764 B2 | 11/2004 | Coelingh et al. |
| 6,834,218 B2 | 12/2004 | Meyers et al. |
| 6,937,928 B2 * | 8/2005 | Capito ............................ 701/37 |
| 7,421,334 B2 * | 9/2008 | Dahlgren et al. .............. 701/117 |
| 2003/0055549 A1 | 3/2003 | Barta et al. |
| 2003/0109939 A1 | 6/2003 | Burgdorf et al. |
| 2003/0171865 A1 | 9/2003 | Moser |
| 2003/0182025 A1 | 9/2003 | Tseng et al. |
| 2004/0006410 A1 * | 1/2004 | Lee .................................. 701/1 |
| 2004/0019418 A1 | 1/2004 | Lu |
| 2004/0026158 A1 | 2/2004 | Rieth et al. |
| 2004/0078131 A1 | 4/2004 | Faye |
| 2004/0119335 A1 | 6/2004 | Szabo et al. |
| 2004/0158368 A1 | 8/2004 | Haas |

FOREIGN PATENT DOCUMENTS

| | | |
|---|---|---|
| DE | 38 15 938 | 11/1989 |
| DE | 43 21 571 | 1/1994 |
| DE | 42 27 886 | 2/1994 |
| DE | 42 28 893 | 3/1994 |
| DE | 43 35 979 | 4/1995 |
| DE | 43 42 732 | 6/1995 |
| DE | 199 07 633 | 10/1999 |
| DE | 10065010 | 12/2000 |
| DE | 10046036 | 3/2002 |
| DE | 10133409 | 1/2003 |
| EP | 0 430 813 | 12/1993 |
| EP | 0 662 601 | 7/1995 |
| EP | 0 758 601 | 2/1997 |
| EP | 1 046 571 | 4/2000 |
| EP | 1 197 409 | 9/2001 |
| FR | 24 25 342 | 12/1979 |
| GB | 2257403 | 1/1993 |
| GB | 2 342 078 | 4/2000 |
| JP | 816849 | 3/1981 |
| JP | 62055211 | 9/1985 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6297985 | 10/1994 |
| JP | 6312612 | 11/1994 |
| JP | 8080825 | 3/1996 |
| JP | 9005352 | 1/1997 |
| JP | 10024819 | 1/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| JP | 11321603 | 11/1999 |
| WO | WO 02/20318 | 3/2002 |

OTHER PUBLICATIONS

U.S. Appl. No. 10/849,590, filed May 20, 2004, Brown.

A method for reducing on-road rollovers—anti-rollover braking, Thomas J. Wielenga, Dynamotive, LLC, International Congress and Exposition, Detroit, Michigan, Mar. 1-4, 1999.

Eger, R., Majjad, R., Naser, N., "Rollover simulation based on a nonlinear model", SAE 98020.

Nalecz, A.G., Bindemann, A.C., Brewer H.K., "Dynamic analysis of vehicle rollover", 12th International Conference on Experimental Safety Vehicles, Goteborg, Sweden, May 29-Jun. 1, 1989.

Niii N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

Chen, Bo-Chivan, Peng, Huei; "A Real-time Rollover Threat Index for Sports Utility Vehicles", Proceedings of the American Control Conference, San Diego, CA, Jun. 1999.

* cited by examiner

SYSTEM FOR DYNAMICALLY DETERMINING VEHICLE REAR/TRUNK LOADING FOR USE IN A VEHICLE CONTROL SYSTEM

CROSS REFERENCE

This application is a divisional of U.S. application Ser. No. 11/010,863, now allowed U.S. Pat. No. 7,660,654 filed on Dec. 13, 2004 herein incorporated by reference.

TECHNICAL FIELD

The present invention relates generally to a control apparatus for controlling a system of an automotive vehicle in response to sensed dynamic behavior, and more specifically, to a method and apparatus for determining a rear vehicle loading and/or the impact of vehicle loading on the control apparatus of the vehicle.

BACKGROUND

Recently, vehicle roll stability control (RSC) schemes, i.e., U.S. Pat. No. 6,324,446, have been proposed to address the issue of friction-induced rollovers. RSC system includes a variety of sensors sensing vehicle states and a controller that controls a distributed brake pressure to reduce a tire force so the net moment of the vehicle is counter to the roll direction.

During an event causing the vehicle to roll, the vehicle body is subject to a roll moment due to the coupling of the lateral tire force and the lateral acceleration applied to the center of gravity of vehicle body. This roll moment causes suspension height variation, which in turn results in a vehicle relative roll angle (also called chassis roll angle or suspension roll angle). The relative roll angle is an important variable that is used as an input to the activation criteria and to construct the feedback pressure command, since it captures the relative roll between the vehicle body and the axle. The sum of the chassis roll angle and the roll angle between wheel axle and the road surface (called wheel departure angle) provides the roll angle between the vehicle body and the average road surface, which is one of the important variables feeding back to the roll stability control module. Trucks, SUVs and cars sometimes are used for carrying heavy loads. For example, a truck full of cargo is loaded in the rear, a trunk of a car may be loaded, and SUV or van may be loaded on its rear. The rear loading may cause the vehicle to have a pitch due to the increased load.

A large rear/trunk load (additional mass) may saturate the lateral forces on the rear axle of the vehicle, making the vehicle more prone to oversteer. In terms of stability, a GWAR (gross weight at rear axle) may cause the vehicle to move with a large side slip angle during some aggressive maneuvers. When the vehicle is sliding at a very large sideslip angle, it gets into nonlinear range of its vehicle dynamics, and sometimes the vehicle could be tripped and rolled over. It is usually hard for the ordinary driver to control and the vehicle dynamics controls have to be activated. Hence, it would be desirable to adjust control authority in stability controls in order to achieve improved performance for a vehicle with large trunk or rear loading.

The large vehicle trunk loading may also have adverse effect on vehicle sensor readings. For example, the trunk loading could cause the vehicle pitch down towards its rear axle. Such loading-induced pitch may cause erroneous readings from a pitch rate sensor, a yaw rate sensor and a longitudinal acceleration sensor. Hence it is desirable to determine such loading-induced pitch misalignment based on the detected trunk or rear loading and to use this information to compensate the sensor signal outputs. Such trunk loading induced pitch misalignment can also be used to conduct vehicle body leveling control and to adjust the orientation of the headlights.

SUMMARY OF THE INVENTION

It is therefore one object of the invention to provide a system for a characterization of the chassis pitch that may be used in conjunction with the various vehicle systems including but not limited to a roll stability control system, a yaw stability control, a headlight leveling control and a vehicle leveling control. In the stability controls, such trunk loading can be used to determine accurate vehicle pitch trending for vehicles, and adaptively adjust the computation of the pitch angle and/or adaptively adjust the activation criteria for the stability control system. More specifically, the present invention may determine an additional mass and position of the mass or the effect of the additional mass and position. That is, a relatively small mass change may significantly impact the directional dynamics of the vehicle. A rear or trunk load can affect the vehicle pitch dynamics and lateral dynamics to increase the vehicle oversteer characteristics. The control system then can make a determination as to how to command the appropriate actuators in an increasing control sense to more aggressively correct the potential unstable condition, or in a desensitizing sense to reduce the amount of actuation for correcting potential false activation.

In one aspect of the invention, a method of controlling a vehicle comprises determining a pitch gradient and/or a pitch acceleration coefficient. That is, the pitch gradient and the pitch acceleration coefficient may be used individually or in combination to control a vehicle system such as a safety system.

In a further aspect of the invention, a method of controlling a safety device for a vehicle comprises determining a composite parameter called pitch gradient, determining another composite parameter called pitch acceleration coefficient, determining an added mass and a position of the added mass from the pitch gradient and the pitch acceleration coefficient, and controlling the vehicle system in response to the added mass and position.

In another aspect of the invention, a control system for an automotive vehicle includes a pitch rate sensor generating a pitch rate signal, a longitudinal acceleration sensor generating a longitudinal acceleration signal, and a yaw rate sensor generating a yaw rate signal. A safety system and the sensors are coupled to a controller. The controller determines an added mass and a position of the added mass from the roll rate, the longitudinal acceleration and the yaw rate and controls the safety system in response to the added mass and position.

One advantage of the invention is that the vehicle trunk loading condition can be detected and determined very accurately. Such loading conditions cannot be accurately detected through vehicle longitudinal dynamics as in some of the existing methods which use engine torque and the vehicle longitudinal acceleration to compute the vehicle mass.

Other advantages and features of the present invention will become apparent when viewed in light of the detailed description of the preferred embodiment when taken in conjunction with the attached drawings and appended claims.

DETAILED DESCRIPTION

Figure 1:
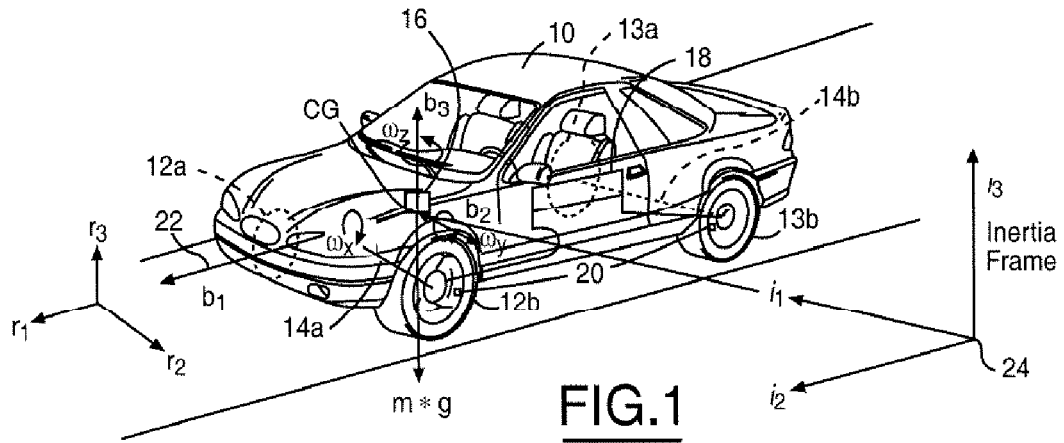
FIG. 1 is a diagrammatic view of a vehicle with coordinate frames according to the present invention.

In the following figures, the same reference numerals will be used to identify the same components. The present invention may be used in conjunction with a rollover control system for a vehicle. The present invention may also be used with a deployment device such as airbag or active roll bar or pre-tensioning belts. The present invention could pass information to an adaptive cruise control system or a brake based collision avoidance system to change the brake request levels of the system. The present invention will be discussed below in terms of preferred embodiments relating to an automotive vehicle moving in a three-dimensional road terrain. The present invention is described with respect to determining an added mass and position of the added mass. However, as will be described below the added mass and position may not be directly determined, rather by adaptively updating a pitch condition parameter such as a pitch gradient value and/or a pitch acceleration coefficient, the effects of added mass and the position of the added mass may be included in those values. Such values may also be referred to as an "adaptive" pitch gradient and an "adaptive" pitch acceleration coefficient. The various pitch parameters may be referred to as adaptively determined meaning that such values may change due to changes in the mass or load over time. That is, such values are not fixed. That is the values may be updated as the vehicle is running or driving. The values may then be averaged.

It should also be noted that while one of the pitch gradient or pitch acceleration coefficient may be adaptively determined, the other two values may not be adaptive.

Referring to FIG. 1, an automotive vehicle 10 with a safety system of the present invention is illustrated with the various forces and moments thereon during a dynamic condition. Vehicle 10 has front right (FR) and front left (FL) wheel/tires 12A and 12B and rear right (RR) wheel/tires 13A and rear left (RL) wheel/tires 13B respectively. The vehicle 10 may also have a number of different types of front steering systems 14a and rear steering systems 14b, including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s² and M is the total mass of the vehicle.

As mentioned above, the system may also be used with safety systems including active/semi-active suspension systems, anti-roll bar, or airbags or other safety devices deployed or activated upon sensing predetermined dynamic conditions of the vehicle.

The sensing system 16 is coupled to a control system 18. The sensing system 16 may comprise many different sensors including the sensor set typically found in a roll stability control or a rollover control system (including lateral accelerometer, yaw rate sensor, steering angle sensor and wheel speed sensor which are equipped for a traditional yaw stability control system) together with a roll rate sensor and a longitudinal accelerometer. The various sensors will be further described below. The sensors may also be used by the control system in various determinations such as to determine a lifting event, determine a position of a mass, etc. The wheel speed sensors 20 are mounted at each corner of the vehicle and generate signals corresponding to the rotational speed of each wheel. The rest of the sensors of sensing system 16 may be mounted directly on the center of gravity of the vehicle body, along the directions x,y and z shown in FIG. 1. As those skilled in the art will recognize, the frame from $b_1, b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. Calculations may take place in an inertial frame 24 that may be derived from the body frame 22 as described below.

The angular rate sensors and the accelerometers may be mounted on the vehicle car body along the body frame directions $b_1, b_2$ and $b_3$ which are the x-y-z axes of the sprung mass of the vehicle.

The longitudinal acceleration sensor is mounted on the car body located at the center of gravity, with its sensing direction along $b_1$-axis, whose output is denoted as $a_x$. The lateral acceleration sensor is mounted on the car body located at the center of gravity, with its sensing direction along $b_2$-axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xbr}$ and $\theta_{ybr}$, which are also called the relative Euler angles (i.e., relative roll and relative pitch angles, respectively).

Figure 2:
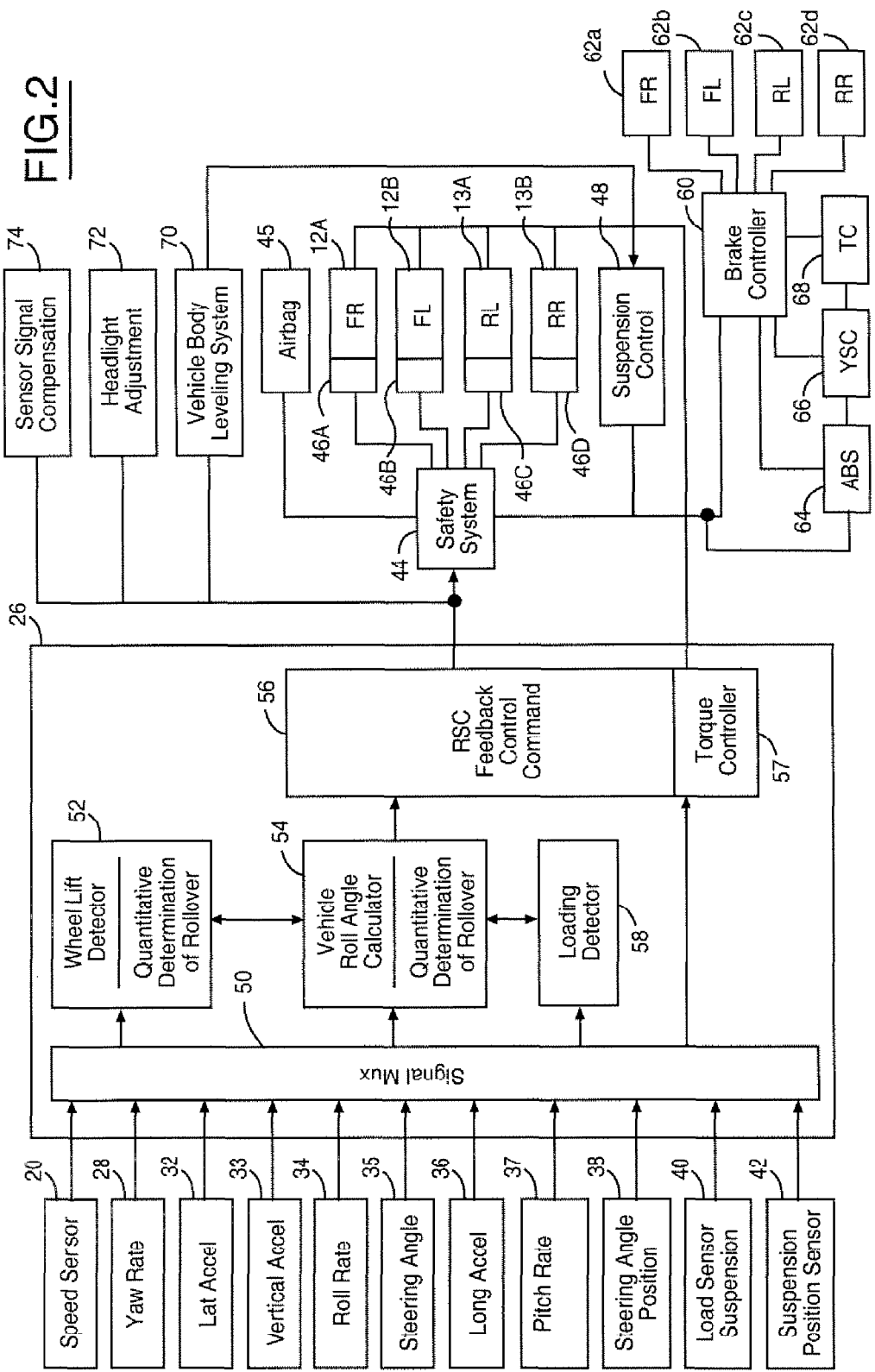
FIG. 2 is a block diagram of a stability system according to the present invention.

Referring now to FIG. 2, roll stability control system 18 is illustrated in further detail having a controller 26 used for receiving information from a number of sensors which may include a yaw rate sensor 28, a speed sensor 20, a lateral acceleration sensor 32, a vertical accelerometer sensor 33, a roll angular rate sensor 34, a steering wheel (hand wheel) angle sensor 35, a longitudinal acceleration sensor 36, a pitch rate sensor 37, steering angle (of the wheels or actuator) position sensor 38, suspension load sensor 40 and suspension position sensor 42. It should be noted that various combinations and sub-combinations of the sensors may be used.

Speed sensor 20 may be one of a variety of speed sensors known to those skilled in the art. For example, a suitable speed sensor may include a sensor at every wheel that is averaged by controller 26. The controller may translate the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Roll angular rate sensor 34 and pitch rate sensor 37 may sense the roll condition or lifting of the vehicle based on sensing the height of one or more points on the vehicle relative to the road surface. Sensors that may be used to achieve this include but are not limited to a radar-based proximity sensor, a laser-based proximity sensor and a sonar-based proximity sensor. The roll rate sensor 34 may also use a combination of sensors such as proximity sensors to make a roll rate determination.

Roll rate sensor 34 and pitch rate sensor 37 may also sense the roll condition or lifting based on sensing the linear or rotational relative displacement or displacement velocity of one or more of the suspension chassis components. This may be in addition to or in combination with suspension position sensor 42. The position sensor 42, roll rate sensor 34 and/or the pitch rate sensor 37 may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition or lifting may also be sensed by sensing directly or estimating the force or torque associated with the loading condition of one or more suspension or chassis components including a pressure transducer in an act of air suspension, a shock absorber sensor such as a load sensor 40, a strain gauge, the steering system absolute or relative motor load, the steering system pressure of the hydraulic lines, a tire laterally force sensor or sensors, a longitudinal tire force sensor, a vertical tire force sensor or a tire sidewall torsion sensor. The yaw rate sensor 28, the roll rate sensor 34, the lateral acceleration sensor 32, and the longitudinal acceleration sensor 36 may be used together to determine that the wheel has lifted. Such sensors may be used to determine wheel lift or estimate normal loading associated with wheel lift. These are passive methods as well.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, the vertical acceleration sensor 33, a vehicle longitudinal acceleration sensor 36, lateral or vertical speed sensor including a wheel-based speed sensor 20, a radar-based speed sensor, a sonar-based speed sensor, a laser-based speed sensor or an optical-based speed sensor.

In the preferred embodiment, the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS). Based upon inputs from the sensors, controller 26 may control a safety device 44. Depending on the desired sensitivity of the system and various other factors, not all the sensors 28-42 may be used in a commercial embodiment.

Load sensor 40 may be a load cell coupled to one or more suspension components. By measuring the stress, strain or weight on the load sensor a shifting of the load can be determined.

Controller 26 may include a signal multiplexer 50 that is used to receive the signals from the sensors 28-42. The signal multiplexer 50 provides the signals to a wheel lift detector 52, a vehicle roll angle calculator 54, and to a roll stability control (RSC) feedback control command 56. Also, wheel lift detector 52 may be coupled to the vehicle roll angle calculator 54.

The vehicle roll angle calculator 54 may also be coupled to the RSC feedback command 56. The RSC feedback command 56 may include a torque controller 57. Vehicle roll angle calculator 54 is described in U.S. Provisional Applications 60/400,376 and 60/400,172, and in U.S. patent application Ser. No. 10/459,697, the disclosures of which are incorporated herein by reference.

A loading detector 58 may also be included in controller 26. The loading detector 58 may be used to determine an additional mass of the vehicle and a position or longitudinal distance of the mass as will be described below.

Safety device 44 may control an airbag 45 or a steering actuator 46A-46 at one or more of the wheels 12A, 12B, 13A, 13B of the vehicle. Also, other vehicle components such as a suspension control 48 may be used to adjust the suspension to prevent rollover.

Safety device 44 may control the position of the front right wheel actuator 46A, the front left wheel actuator 46B, the rear left wheel actuator 46C, and the right rear wheel actuator 46D. Although as described above, two or more of the actuators may be simultaneously controlled. For example, in a rack-and-pinion system, the two wheels coupled thereto are simultaneously controlled. Based on the inputs from sensors 28 through 42, controller 26 determines a roll condition and/or wheel lift and controls the steering position and/or braking of the wheels.

Safety device 44 may be coupled to a brake controller 60. Brake controller 60 controls the amount of brake torque at a front right brake 62A, front left brake 62b, rear left brake 62c and a rear right brake 62d. Other safety systems such as an antilock brake system 64, a yaw stability control system 66 and a traction control system 68 may also benefit from the knowledge of the pitch gradient, the pitch acceleration coefficient, additional mass and position of the mass. This information may impact the control strategy such as an amount of braking may be modified.

The output of the controller may be coupled to a vehicle body leveling system 70, a headlight adjustment system 72 and a sensor signal compensation block 74. The body leveling system 70 may be coupled to suspension control 48 which control the suspension to compensate for the change in the pitch angle due to added mass. The headlight aiming direction may also be changed with headlight adjustment block 72. Various sensor signals may be changed by a factor due to the induced pitch misalignment.

The roll condition is one condition that may be sensed and modified due to additional load. The roll condition of a vehicle can be characterized by the relative roll angle between the vehicle body and the wheel axle and the wheel departure angle (between the wheel axle and the average road surface). Both the relative roll angle and the wheel departure angle may be calculated in relative roll angle estimation module by using the roll rate and lateral acceleration sensor signals. If both the relative roll angle and the wheel departure angles are large enough, the vehicle may be in either single wheel lifting or double wheel lifting. On the other hand, if the magnitude of both angles is small enough, the wheels are likely all grounded. In the case that both of them are not small and the double wheel lifting condition is detected or determined, the sum of those two angles will be used by the feedback control module to compute the desired actuation command for achieving rollover control performance.

The roll condition of a vehicle can be characterized by rolling radius-based wheel departure roll angle, which captures the angle between the wheel axle and the average road surface through the dynamic rolling radii of the left and right wheels when both of the wheels are grounded. Since the computation of the rolling radius is related to the wheel speed and the linear velocity of the wheel, such rolling-radius based wheel departure angle will assume abnormal values when there are large wheel slips. This happens when a wheel is lifted and there is torque applied to the wheel. Therefore, if this rolling radius-based wheel departure angle is increasing rapidly, the vehicle might have lifted wheels. Small magnitude of this angle indicates the wheels are all grounded.

The roll condition of the vehicle can be seen indirectly from the wheel longitudinal slip. If during a normal braking or driving torque the wheels at one side of the vehicle experience increased magnitude of slip, then the wheels of that side are losing longitudinal road torque. This implies that the wheels are either driven on a low mu surface or lifted up. The low mu surface condition and wheel-lifted-up condition can be further differentiated based on the chassis roll angle computation, i.e., in low mu surface, the chassis roll angle is usually very small. Hence, an accurate determination of chassis roll is desired.

The roll condition of the vehicle can be characterized by the normal loading sustained at each wheel. Theoretically, when a normal loading at a wheel decreases to zero, the wheel is no longer contacting the road surface. In this case a potential rollover is underway. Large magnitude of this loading indicates that the wheel is grounded. Normal loading is a function of the calculated chassis roll and pitch angles. Hence, an accurate determination of chassis roll and pitch angles is desired.

The roll condition can be identified by checking the actual road torques applied to the wheels and the road torques, which are needed to sustain the wheels when they are grounded. The actual road torques can be obtained through torque balancing for each wheel using wheel acceleration, driving torque and braking torque. If the wheel is contacting the road surface, the calculated actual road torques must match or be larger than the torques determined from the nonlinear torques calculated from the normal loading and the longitudinal slip at each wheel.

The roll condition of a vehicle can be characterized by the chassis roll angle itself, i.e., the relative roll angle $\theta_{xr}$ between the vehicle body and the wheel axle. If this chassis roll angle is increasing rapidly, the vehicle might be on the edge of wheel lifting or rollover. Small magnitude of this angle indicates the wheels are not lifted or are all grounded. Hence, an accurate determination of the chassis roll angle is beneficial for determining if the vehicle is in non-rollover events.

The roll condition of a vehicle can also be characterized by the roll angle between the wheel axle and the average road surface, this is called wheel departure angle. If the roll angle is increasing rapidly, the vehicle has lifted wheel or wheels and aggressive control action needs to be taken in order to prevent the vehicle from rolling over. Small magnitude of this angle indicates the wheels are not lifted.

The center of gravity C is also illustrated with nominal mass M. A roll axis is also illustrated at a distance D from the center of gravity. $a_y$ is the lateral acceleration.

Figure 3:
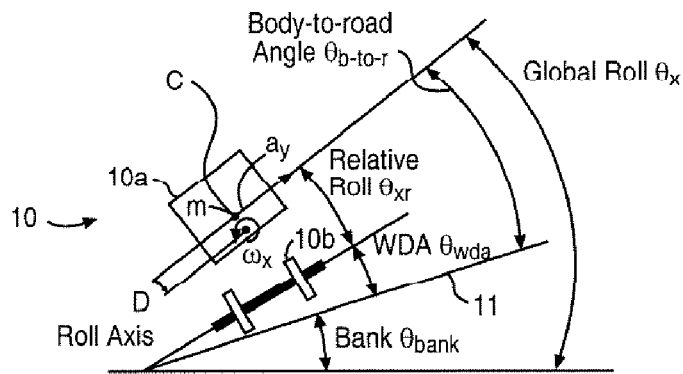
FIG. 3 is a front view of an automotive vehicle illustrating various angles according to the present invention.

Referring now to FIG. 3, the relationship of the various angles of the vehicle 10 relative to the road surface 11 is illustrated. In the following, a reference road bank angle $\theta_{bank}$ is shown relative to the vehicle 10 on a road surface. The vehicle has a vehicle body 10a and wheel axle 10b. The wheel departure $\theta_{wda}$ is the angle between the wheel axle and the road. The relative roll angle $\theta_{xr}$ is the angle between the wheel axle 10b and the body 10a. The global roll angle $\theta_x$ is the angle between the horizontal plane (e.g., at sea level) and the vehicle body 10a.

Another angle of importance is the linear bank angle. The linear bank angle is a bank angle that is calculated more frequently (perhaps in every loop) by subtracting the relative roll angle generated from a linear roll dynamics of a vehicle (see U.S. Pat. No. 6,556,908 which is incorporated by reference herein), from the calculated global roll and pitch angles (as the one in U.S. patent application Ser. No. 09/789,656, which is incorporated by reference herein). If all things were slowly changing without drifts, errors or the like, the linear bank angle and reference road bank angle terms would be equivalent.

Figure 5:
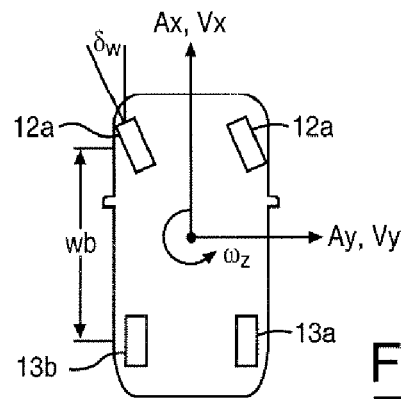
FIG. 5 is a top view of an automotive vehicle having variables used in the following calculations thereon.
Figure 4:
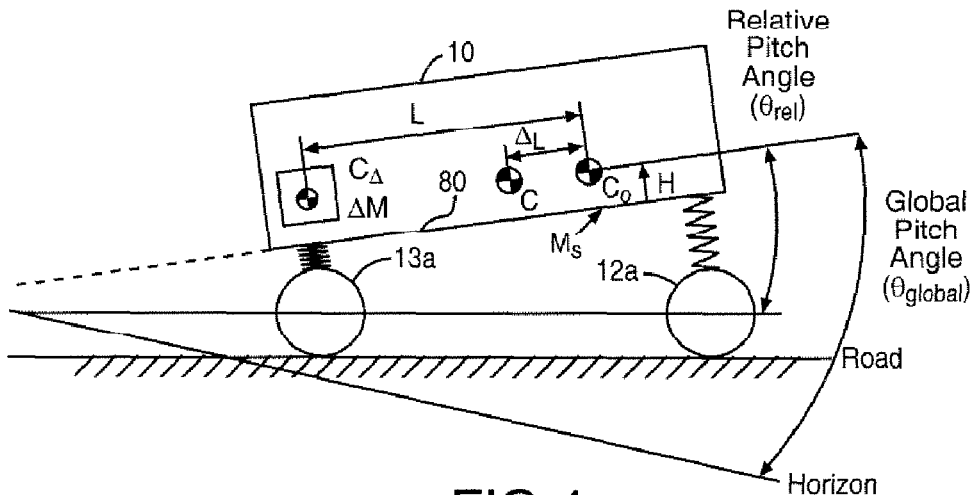
FIG. 4 is a side view of an automotive vehicle in a pitching condition illustrating various variables thereon.

Referring now to FIGS. 4 and 5, an automotive vehicle 10 is illustrated with various parameters illustrated thereon. A change in mass $\Delta M$ is illustrated relative to nominal center of gravity $C_0$. The center of gravity moves to C when the added mass $\Delta M$ is added thereto. The change in mass or load $\Delta M$ is positioned at a distance H above the load floor 80. The nominal center of gravity $C_0$ is located a distance L from the added mass in longitudinal direction. The longitudinal distance between the new center of gravity and the nominal center of gravity $C_0$ is $\Delta L$.

In FIG. 5, the longitudinal acceleration is denoted by $a_x$ whereas the longitudinal velocity is denoted $v_x$. The lateral acceleration and lateral velocity is denoted by $a_y, v_y$ respectively. The steering wheel angle is denoted by $\delta_w$. The wheelbase of the vehicle is denoted by the symbol b.

Figure 6:
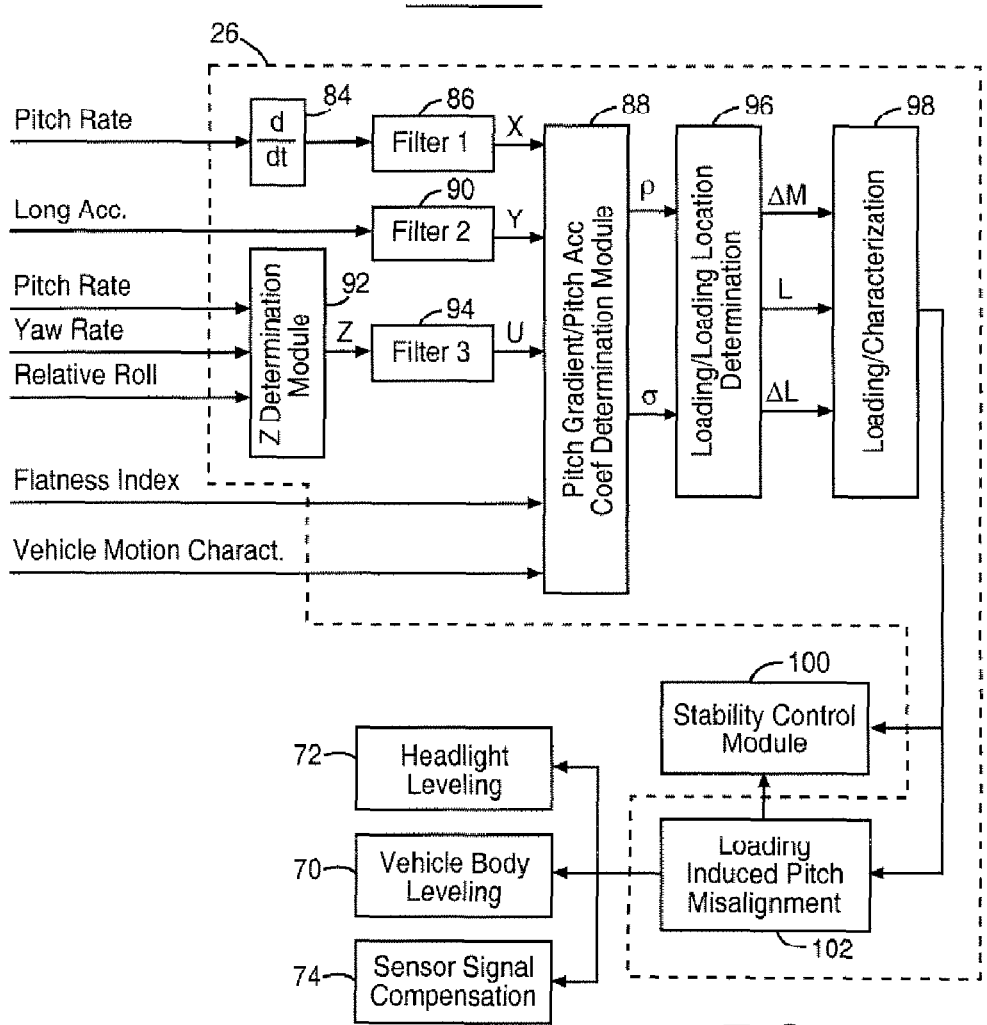
FIG. 6 is a detailed block diagrammatic view of a controller according to one embodiment of the present invention.

Referring now to FIG. 6, controller 26 is illustrated in further detail. Controller 26 receives the various sensor signals, for example, the pitch rate, longitudinal acceleration, and yaw rate from the respective sensor signals. Other input signals such as the relative roll angle, flatness index and vehicle motion characteristics may be determined from other various sensor signals or from a stability control system such as a roll stability control system. The flatness index provides an indication as to the flatness (pitch/bank) of the road. One way to determine a flatness index is set forth in U.S. Pat. No. 6,178,248, which is incorporated by reference herein. Vehicle motion characteristics may, for example, provide an indication of the motion of the vehicle such as acceleration or deceleration. From the sensor signals, the loading position in a longitudinal direction and amount of loading, and the pitch gradient and pitch acceleration coefficient may be determined. These values may ultimately generate a vehicle pitch angle compensation term, which can be used for correcting sensor signals and for a roll stability control system to adjust control gains and thresholds. Instead of directly determining the load and position of the load, an adaptive pitch acceleration coefficient and an adaptive pitch gradient may be determined first. Such parameters inherently relate to the load and position of the load included therein. Therefore they can be used to find the loading and the loading position. As will be further described below, the controller 26 uses the pitch rate signal and performs a derivative in box 84 to generate the pitch acceleration signal $\dot{\omega}_y$, which is then filtered by the first filter 86 to generate the variable X. The X value is provided to the pitch gradient and pitch acceleration coefficient determination module 88. The longitudinal acceleration signal is filtered in the second filter 90 and provided to the pitch gradient and pitch acceleration coefficient determination module 88 illustrated as Y. The pitch rate, yaw rate and relative roll angle are provided to a Z determination module 92 to determine the intermediate variable Z. The intermediate variable Z is filtered in the third filter number 94 and provided to pitch gradient and pitch acceleration coefficient determination module 88. As will be further described below, the output of the pitch gradient and pitch acceleration coefficient determination module 88 is the pitch gradient and the pitch acceleration coefficient which are provided to a loading/loading position detection block 96. The loading/loading position detection block 96 generates a change in mass, a position signal and a change in position signal corresponding to a change in the center of gravity of the vehicle. A vehicle loading compensation term is generated in loading characterization block 98. The output of the loading characterization block 98, may be provided to a stability control module and/or a loading induced pitch misalignment module. The loading induced pitch misalignment may be used by the vehicle body leveling system 70, the headlight adjustment system 72 and the sensor signal compensation block 74.

Figure 7:
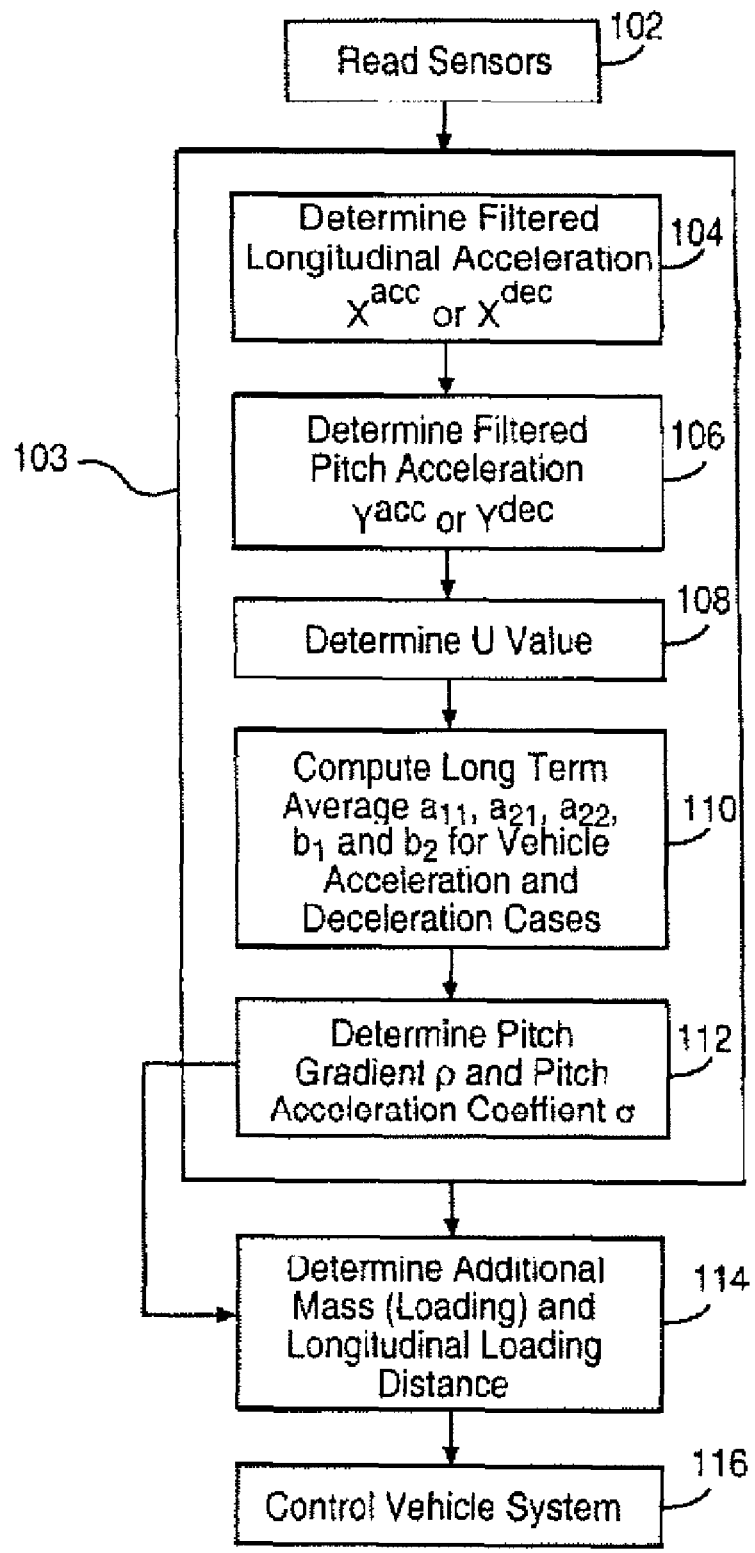
FIG. 7 is a flowchart of a method of operating the present invention.

Referring now to FIG. 7, the operation of the controller 26 is described in further detail. In step 102, the various sensors such as the pitch rate sensor, the longitudinal acceleration sensor, and yaw rate sensor are read. In step 103, the pitch gradient and pitch acceleration coefficient are determined.

There are two pitch angle computations set forth below. Ultimately a pitch gradient and a pitch acceleration coefficient are derived from the relative pitch angle and the other the global pitch angle. The relative pitch angle $\phi_{relative}$ is a function of the longitudinal acceleration $a_x$, the pitch acceleration $\dot{\omega}_y$, the pitch gradient $\rho$ and the pitch acceleration coefficient $\sigma$ $$\phi_{relative} = f(a_x, \dot{\omega}_y; \rho, \sigma) \qquad (1)$$

In z-transformation, $$\phi_{relative} = \rho T_{pitch}(z) a_x - \sigma T_{pitch}(z) \dot{\omega}_y \qquad (2)$$

where $$\begin{cases} H = h + \dfrac{B}{2A} + \sqrt{\dfrac{1}{4}\left(\dfrac{B}{A}\right)^2 + h\left(\dfrac{B}{A}\right) + \left(\dfrac{B}{M_s}\right)^2} \\ \Delta M = \dfrac{\alpha}{h + \dfrac{B}{2\alpha} + \sqrt{\dfrac{1}{4}\left(\dfrac{B}{A}\right)^2 + h\left(\dfrac{B}{A}\right) + \left(\dfrac{B}{M_s}\right)^2}} \end{cases}$$

is a filter which reflects the linear pitch model of the vehicle. Notice that during deceleration and acceleration, vehicle pitch motion behaves differently. In this case, $$\begin{cases} H = h + \dfrac{B}{2A}\sqrt{\dfrac{1}{4}\left(\dfrac{B}{A}\right)^2 + h\left(\dfrac{B}{A}\right) + \left(\dfrac{B}{M_s}\right)^2} \\ \Delta M = \dfrac{\alpha}{h + \dfrac{B}{2\alpha} + \sqrt{\dfrac{1}{4}\left(\dfrac{B}{A}\right)^2 + h\left(\dfrac{B}{A}\right) + \left(\dfrac{B}{M_s}\right)^2}} \end{cases}$$

should be tuned differently for deceleration and acceleration. Denote the pitch transfer function as $T_{pitch\_acc}(z)$ during vehicle acceleration, and as $T_{pitch\_dec}(z)$ during vehicle deceleration. Similarly the pitch gradient and the pitch acceleration coefficient are different for the vehicle acceleration and deceleration and they are denoted as $\rho^{acc}$ and $\sigma^{acc}$ for acceleration, and $\rho^{dec}$ and $\sigma^{dec}$ for deceleration.

On level ground, the global pitch angle $\phi_{global}$ is a function of the pitch rate $\omega_y$, the yaw rate $\omega_z$, relative roll angle $\theta_{relative}$ and the relative pitch angle $\phi_{relative}$ $$\phi_{global} = g(\omega_y, \omega_z, \theta_{relative}, \phi_{relative}) \qquad (3)$$

In z-transformation, $$\phi_{global} = T_{adi}(z)[\omega_y - \omega_z \theta_{relative}] + T_{ssc}(z) \phi_{relative} \qquad (4)$$

where $T_{adi}(z)$ and $T_{ssc}(z)$ are two filters to conduct anti-drift integration and steady state compensation. Notice that on level ground, the relative pitch angle and the global pitch angle are equal. Therefore from (1) and (3) or (2) and (4), relationships between the pitch gradient $\rho$ and the pitch acceleration coefficient $\sigma$ may be determined. Inserting (2) into (4) during acceleration, $$\phi_{global} = T_{adi}(z)[\omega_y - \omega_z \theta_{relative}] + \rho^{acc} T_{ssc}(z) T_{pitch\_acc}(z) a_x - \sigma^{acc} T_{ssc}(z) T_{pitch\_acc}(z) \dot{\omega}_y \qquad (5)$$

or the following for deceleration $$\phi_{global} = T_{adi}(z)[\omega_y - \omega_z \theta_{relative}] + \rho^{dec} T_{ssc}(z) T_{pitch\_dec}(z) a_x - \sigma^{dec} T_{ssc}(z) T_{pitch\_dec}(z) \dot{\omega}_y \qquad (6)$$

By equating (2) and (5) for vehicle acceleration case, the following equation may be obtained $$\rho^{acc} X^{acc} - \sigma^{acc} Y^{acc} = U \qquad (7)$$

where $$X^{acc} = T_{ssc}(z)[T_{pitch\_acc}(z) - 1] a_x$$

$$Y^{acc} = T_{ssc}(z)[T_{pitch\_acc}(z) - 1] \dot{\omega}_y \qquad (8)$$

and U is computed as the following $$U = T_{adi}(z)[\omega_y - \omega_z \theta_{relative}] \qquad (9)$$

Similarly, by equating (2) and (6) for vehicle deceleration case, the following equation may be obtained $$\rho^{dec} X^{dec} - \sigma^{dec} Y^{dec} = U \qquad (10)$$

where $$X^{dec} T_{ssc}(z)[T_{pitch\_dec}(z) - 1] a_x$$

$$Y^{dec} = T_{ssc}(z)[T_{pitch\_dec}(z) - 1] \dot{\omega}_y \qquad (11)$$

The following is a summary of the computation algorithm. In step 104, the filtered longitudinal acceleration X is determined in the following iterative equation $$X_k = d_{x1} X_{k-1} + d_{x2} X_{k-2} + d_{x3} X_{k-3} + n_{x1} a_{x_k} + n_{x2} a_{x_{k-1}} + n_{x3} a_{k-2} \qquad (12)$$

where $d_{x_i} n_{x_i}$ are the involved filter coefficients. Notice that, the above computation is good for both acceleration and deceleration, and the deceleration value is denoted as $X^{dec}$ and the acceleration value is denoted as $X^{acc}$ with different sets of filter coefficients. When the vehicle longitudinal acceleration signals $a_x$ is changing from a positive value to a negative value and crossing zero value at the time instant k, the following reset is used to start the computation for $X^{dec}$ $$X_{k-1}^{dec} = X_{k-1}^{acc}$$

$$X_{k-2}^{dec} = X_{k-2}^{acc}$$

$$X_{k-3}^{dec} = X_{k-3}^{acc} \qquad (13)$$

and the computation for $X^{acc}$ is stopped. Similarly, when the vehicle's longitudinal acceleration signal $a_x$ is changing from a negative value to a positive value and crossing zero value at the time instant t, the following reset is used to start the computation for $X^{acc}$ $$X_{t-1}^{acc} = X_{t-1}^{dec}$$

$$X_{t-2}^{acc} = X_{t-2}^{dec}$$

$$X_{t-3}^{acc} = X_{t-3}^{dec} \qquad (14)$$

and the computation for $X^{dec}$ is stopped.

In step 106, the filtered pitch acceleration Y is determined in the following iterative equation $$Y = d_{x1}Y_{k-1} + d_{x2}Y_{k-2} + d_{x3}Y_{k-3} + n_{x1}\dot{\omega}_{y_k} + n_{x2}\dot{\omega}_{y_{k-1}} + n_{x3}\dot{\omega}_{y_{k-2}} \quad (15)$$

Notice that the above computation is good for both acceleration and deceleration, and the corresponding values are denoted as $Y^{dec}$ and $Y^{acc}$ respectively with different sets of filter coefficients. The similar reset schemes such as those in (13) and (14) for $X^{dec}$ and $X^{acc}$ are also used here.

In step 108, the filtered value U is determined in (9) as $$U_k = d_{u_0}U_k + d_{u_1}U_{k-1} + d_{u_2}U_{k-2} + n_{u_0}Z_k + n_{u_1}Z_{k-1} + n_{u_2}Z_{k-2} \quad (16)$$

where $$Z_k = \omega_{y_k} - \omega_{z_k}\theta_{relative_k} \quad (17)$$

where $d_{ui}, n_{ui}$ for $i=1,2,3,4$ are the involved $2^{nd}$ set of filter coefficients.

Using the calculated value variables $X_k^{acc}, Y_k^{acc}$ at each sampling instant k (during vehicle acceleration), or the calculated value $X_t^{dec}, Y_t^{dec}$ at each sampling instant t (during vehicle deceleration), $U_k$ and $U_t$, equation (7) and (10) can be used to potentially compute the unknown parameters of the pitch gradient $\rho^{acc}$ and $\rho^{dec}$ the pitch acceleration coefficient $\sigma^{acc}$ and $\sigma^{dec}$.

Since equations (7) and (10) are true when the vehicle is driven on level ground and the vehicle does not have any wheel in the air (4 tires are contacting the road), a conditional least-square (CLS) method can be used. Two CLS's may be used. The first CLS method conduct $\rho^{acc}$ or $\rho^{dec}$ and $\sigma^{acc}$ or $\sigma^{dec}$ parameter updating after a fixed number of conditional samples, while the second method updates $\rho^{acc}$ or $\rho^{dec}$ and $\sigma^{acc}$ or $\sigma^{dec}$, and resets a covariance matrix at each conditional sample.

Since $\rho^{acc}$ or $\rho^{dec}$ and $\sigma^{acc}$ or $\sigma^{dec}$ are related to the inertia parameters of the pitch motion of the vehicle body, only if the vehicle pitch mode is fully excited they can be identified correctly through least-square methods. The brake actions either from a driver brake request or controlled brake request through a stability control system can be used as such an excitation source. The same is true for vehicle throttling. However, under the steady-state driving condition (coasting) or vehicle acceleration/deceleration is smaller than a threshold, the least-square identification is not conducted. Considering the driver steering input could induce both roll and pitch dynamics (sharp turn causes vehicle weight towards the front), hence the steering wheel angle velocity could be also used for identifying conditions for pitch mode excitation $$\delta_{wv\,min} \leq |\dot{\delta}_w| \leq \delta_{wv\,max} \text{ and } |\delta_w| \geq \delta_{w\,min} \quad (18)$$

where $\delta_w$ is the measured steering wheel angle, $\delta_{wv\,min}$ and $\delta_{wv\,max}$ are two thresholds to bound the magnitude of the steering angle velocity. $\delta_{w\,min}$, is a threshold for bounding the magnitude of the steering wheel angle. The reason we actually limit the upper bound of the steering wheel angle velocity is due to the consideration that extremely fast steering input could generate unrealistic dynamics.

In step 110, the conditional sum of the products or cross products of the above filtered variables are determined over a significant large number N of the conditional samples. This is performed using the following iterative algorithm if the first CLS method is used $$\text{if } ((a_x \geq a_{xmin} \quad (19)$$

$$\text{or } (a_x \geq 0 \ \& \ \delta_{wvmin} \leq |\dot{\delta}_w| \leq \delta_{wvmax} \ \& |\delta_w| \leq \delta_{wmax}))$$

& level ground

& $s \leq N$)

{

$$a_{11_{s+1}}^{acc} = a_{11_s}^{acc} + (X_k^{acc})^2$$

$$a_{21_{s+1}}^{acc} = a_{21_s}^{acc} - X_k^{acc}Y_k^{acc}$$

$$a_{22_{s+1}}^{acc} = a_{22_s}^{acc} + (Y_k^{acc})^2$$

$$b_{1_{s+1}}^{acc} = b_{1_s}^{acc} + X_k^{acc}U_k$$

$$b_{2_{s+1}}^{acc} = b_{2_s}^{acc} - Y_k^{acc}U_k$$

$$s = s + 1$$

}

When the vehicle is decelerated $$\text{if } ((a_x \leq -a_{xmin} \quad (20)$$

$$\text{or } (a_x \leq 0 \ \& \ \delta_{wvmin} \leq |\dot{\delta}_w| \leq \delta_{wvmax} \ \& |\delta_w| \leq \delta_{wmax}))$$

& level ground

& $s \leq N$)

{

$$a_{11_{s+1}}^{dec} = a_{11_s}^{dec} + (X_t^{dec})^2$$

$$a_{21_{s+1}}^{dec} = a_{21_s}^{dec} - X_t^{dec}Y_t^{dec}$$

$$a_{22_{s+1}}^{dec} = a_{22_s}^{dec} + (Y_t^{dec})^2$$

$$b_{1_{s+1}}^{dec} = b_{1_s}^{dec} + X_t^{dec}U_k$$

$$b_{2_{s+1}}^{dec} = b_{2_s}^{dec} - Y_t^{dec}U_k$$

$$s = s + 1$$

}

Notice that the time instant denoted by k and t is different from the CLS updating instant denoted by s. Only if the conditions are satisfied all the time, then s=k and t. N in (19) and (20) is the total number of conditional samples used for the CLS, which could have value ranged from 1000 to 80,000.

Step 110 is performed for the conditional sample when the road is a level ground. The level ground can be identified if there is an indication that the vehicle is not on a significantly banked road. Therefore, checking the road bank angle can be used for this purpose for example, using the method disclosed in U.S. Pat. No. 6,718,248. The level of the ground can also be checked through a flatness index (as in the one calculated in U.S. Pat. No. 6,718,248), or a road profile detection (see U.S. Pat. No. 6,718,248), or a rough comparison between the global roll angle and the nominal chassis roll angle.

In step 112, the pitch gradient and pitch acceleration coefficient are calculated. $\rho^{acc}$ and $\sigma^{acc}$ are computed as in the following $$\text{if } s = N \quad (21)$$

{

$$D^{acc} = \min\left(\max\left(a_{11_N}^{acc} - \frac{(a_{21_N}^{acc})^2}{\max(a_{22_N}^{acc}, a_{min})}, -a_{min}\right), a_{min}\right);$$

-continued $$\rho^{acc} = \min\left(\max\left(\left(b_{1_N} - \frac{a_{21_N}^{acc} b_{2_N}^{acc}}{\max(a_{22_N}, a_{min})}\right)\frac{1}{D^{acc}}, \underline{\rho}^{acc}\right), \overline{\rho}^{acc}\right);$$

$$\sigma^{acc} =$$
$$\min\left(\max\left(\left(\frac{a_{11_N}^{acc} b_{2_N}^{acc}}{\max(a_{22_N}^{acc}, a_{min})} - \frac{a_{21_N}^{acc} b_{1_N}^{acc}}{\max(a_{22_N}^{acc}, a_{min})}\right)\frac{1}{D^{acc}}, \underline{\sigma}^{acc}\right), \overline{\sigma}^{acc}\right);$$

$$s = 0;$$
$$a_{11_s}^{acc} = 0;\ a_{21_s}^{acc} = 0;\ a_{22_s}^{acc} = 0;$$
$$b_{1_s}^{acc} = 0;\ b_{2_s}^{acc} = 0;$$
} where $a_{min}$ is a small number (for example, 0.0001), which is used to remove division by zero in the implemented computation; $\underline{\rho}^{acc}$ and $\overline{\rho}^{acc}$ are the respective lower and upper bounds of the pitch gradient, which can be calculated as $$\underline{\rho}^{acc} = \rho_0^{acc} - \Delta\rho$$

$$\overline{\rho}^{acc} = \rho_0^{acc} + \Delta\rho \quad (22)$$

and $\rho_0^{acc}$ is the nominal value of the pitch gradient (obtained through vehicle testing for the vehicle with nominal loading), $\Delta\rho$ is the allowed variation of the pitch gradient; $\underline{\sigma}^{acc}$ and $\overline{\sigma}^{acc}$ are the respective lower and upper bounds of the pitch acceleration coefficient, which can be obtained as $$\underline{\sigma}^{acc} = \sigma_0^{acc} - \Delta\sigma$$

$$\overline{\sigma}^{acc} = \sigma_0^{acc} + \Delta\sigma \quad (23)$$

and $\sigma_0^{acc}$ is the nominal value of the pitch acceleration coefficient (for vehicle with nominal loading), $\Delta\sigma$ is the allowed variation of the pitch acceleration coefficient. Similarly, the deceleration computation can be conducted.

If the second CLS method is used, the pitch gradient $\rho$ and the pitch acceleration coefficient $\sigma$ can be calculated through the following iterative algorithm. First, during vehicle acceleration, a 2 by 2 matrix variable $V_{s+1}$ at the $(s+1)$th conditional time instant is calculated from its past value $V_s$ and the calculated filtered values of $X_k^{acc}$ and $Y_k^{acc}$ as in the following $$\text{if } ((a_x \geq a_{xmin} \quad (24)$$
$$\text{or } (a_x \geq 0\ \&\ \delta_{wvmin} \leq |\delta_w| \leq \delta_{wvmax}\ \&|\delta_w| \leq \delta_{wmax}))$$
$$\&\ \text{level ground}$$
$$\&\ s \leq N)$$
{
  if $(s = 0)$
  $$\left\{V_0 = \begin{bmatrix} v_0 & 0 \\ 0 & v_0 \end{bmatrix};\right\}$$

$$V_{s+1} = V_s - g\frac{V_s\begin{bmatrix} (X_k^{acc})^2 & -X_k^{acc}Y_k^{acc} \\ -X_k^{acc}Y_k^{acc} & (Y_k^{acc})^2 \end{bmatrix}V_s}{1 + \gamma[X_k^{acc}\ -Y_k^{acc}]V_s[X_k^{acc}\ -Y_k^{acc}]^T};$$
} where g, $\gamma$ and $v_0$ are three positive numbers, and the time instant k denotes the regular time instant and the time instant s is the conditional time instant. Equation (24) is also called the covariance resetting in the normalized least square algorithm. During deceleration, a similar computation to (22) is conducted.

The pitch gradient and the pitch acceleration coefficient are calculated using the 2 by 2 matrix $V_s$, and the calculated filtered values $X_k$, $Y_k$, and $U_k$, as in the following for acceleration case $$\text{if } ((a_x \geq a_{xmin} \quad (25)$$
$$\text{or } (a_x \geq 0\ \&\ \delta_{wvmin} \leq |\delta_w| \leq \delta_{wvmax}\ \&|\delta_w| \leq \delta_{wmax}))$$
$$\&\ \text{level ground}$$
$$\&\ s \leq N)$$
{
  $$\begin{bmatrix} \rho_{s+1} \\ \sigma_{s+1} \end{bmatrix}^{acc} = \begin{bmatrix} \rho_s \\ \sigma_s \end{bmatrix}^{acc} - g\frac{S_s[X_k^{acc}\ -Y_k^{acc}]^T U_k}{1 + \gamma[X_k^{acc}\ -Y_k^{acc}]S_s[X_k^{acc}\ -Y_k^{acc}]^T};$$
  $$s = s + 1;$$
}

Similar computation for deceleration can be conducted.

The calculated values are also limited to within their feasible sets as in the following for acceleration case $$\rho_{s+1}^{acc} = \text{sat}(\rho_{s+1}^{acc}, \rho_0^{acc} - \Delta\rho, \rho_0^{acc} + \Delta\rho)$$
$$\sigma_{s+1}^{acc} = \text{sat}(\sigma_{s+1}^{acc}, \sigma_0^{acc} - \Delta\sigma, \sigma_0^{acc} + \Delta\sigma) \quad (26)$$

and the following for deceleration case $$\rho_{t+1}^{dec} = \text{sat}(\rho_{s+1}^{dec}, \rho_0^{dec} - \Delta\rho, \rho_0^{dec} + \Delta\rho)$$
$$\sigma_{s+1}^{dec} = \text{sat}(\sigma_{s+1}^{dec}, \sigma_0^{dec} - \Delta\sigma, \sigma_0^{dec} + \Delta\sigma)$$

During the time instant where the conditions for (24) and (25) do not hold, the computations are frozen to the last values.

From the calculated pitch gradient and the pitch acceleration coefficient in step 112, the vehicle loading and its distance to the c.g. of the vehicle body in the vertical direction can be determined in step 114.

The variable $M_s$ is the nominal vehicle body mass and the distance of the initial center of gravity $C_0$ of the vehicle body from the rear axle is denoted as L which is measured in the longitudinal direction parallel to the vehicle floor (see FIG. 4). If a loading of an additional mass $\Delta M$ is added to the trunk or rear portion of the vehicle, and the distance between the center of gravity $C_A$ of this mass and the rear axle is assumed zero, the center of gravity C of the vehicle body with the extra mass is likely to change. The longitudinal distance between $C_0$ and C is $\Delta L$. Then $$\Delta L = \frac{\Delta M}{M_s + \Delta M}L \quad (27)$$

The total pitch inertial of momentum of the vehicle body with respect to the final (with the added mass) center of gravity C may be expressed as $$I_{yc} = I_{yc}^M + I_{yc}^{\Delta M} \quad (28)$$

where $$I_{yc}^M = I_{yc0} + M_s\Delta L^2$$

$$I_{yc}^{\Delta M} = \Delta M(L - \Delta L)^2 \quad (29)$$

By plugging (27) into (29), (28) can be expressed as the following $$I_{yc} = I_{yc0} + \frac{M_s \Delta M L^2}{M_s + \Delta M} \tag{30}$$

Let the nominal pitch gradient and the pitch acceleration coefficient be $\rho_0$ and or $\sigma_0$, then $$\rho_0 = \frac{M_s h}{K_{pitch}} \tag{31}$$

$$\sigma_0 = \frac{I_y}{K_{pitch}}$$

where $K_{pitch}$ denotes the pitch stiffness due to suspension and its value is different for vehicle deceleration and acceleration. Denote them as $K_{pitch\_acc}$ for acceleration and $K_{pitch\_dec}$ for deceleration respectively. Then for vehicle accelerating, $$\rho_0^{acc} = \frac{M_s h}{K_{pitch\_acc}} \tag{32}$$

$$\sigma_0^{acc} = \frac{I_y}{K_{pitch\_acc}}$$

and for vehicle decelerating, $$\rho_0^{dec} = \frac{M_s h}{K_{pitch\_dec}} \tag{33}$$

$$\sigma_0^{dec} = \frac{I_y}{K_{pitch\_dec}}$$

Using those nominal values and the calculated values $\rho^{dec}$, $\sigma^{dec}$, and $\rho^{acc}, \sigma^{acc}$, the loading mass and the loading distance satisfy the following for acceleration case $$\Delta ML = K_{pitch\_acc}(\rho^{acc} - \rho_0^{acc}) = A_{acc} \tag{34}$$

$$\frac{\Delta M M_s L^2}{M_s + \Delta M} = K_{pitch\_dec}(\sigma^{dec} - \sigma_0^{dec}) = B_{dec}$$

and for deceleration case $$\Delta ML = K_{pitch\_decc}(\rho^{dec} - \rho_0^{dec}) = A_{dec} \tag{35}$$

$$\frac{\Delta M M_s L^2}{M_s + \Delta M} = K_{pitch\_dec}(\sigma^{dec} - \sigma_0^{dec}) = B_{dec}$$

Theoretically, (34) and (35) should be the same, but due to numerical error, a slight difference is possible. For this reason, the averaged values will be used $$A = \frac{A_{dec} + A_{acc}}{2} \tag{36}$$

$$B = \frac{B_{dec} + B_{acc}}{2}$$

From the relationship in (34) or (35) and the average values in (36), the following estimations of the added mass and the position of the added mass are determined.

$$\begin{cases} L = \frac{B}{2A} + \sqrt{\frac{1}{4}\left(\frac{B}{A}\right)^2 + \left(\frac{B}{M_s}\right)^2} \\ \Delta M = \frac{A}{\frac{B}{2A} + \sqrt{\frac{1}{4}\left(\frac{B}{A}\right)^2 + \left(\frac{B}{M_s}\right)^2}} \end{cases} \tag{37}$$

In step 116 one of the vehicle systems is controlled. The is a safety system such one described above such as a roll or yaw stability system, or one of the vehicle body leveling system 70, the headlight adjustment system 72 and the sensor signal compensation block 74.

In step 100 of FIG. 6, a stability control system such as a roll stability control system or a yaw stability control system is controlled in response to the added mass and the height of the added mass. The safety system may also be controlled directly from the pitch gradient and pitch acceleration coefficient, both of which may be adaptive. A stability control gain/threshold compensation term may also be generated based on the pitch gradient, pitch acceleration coefficient, or the added trunk mass. The threshold may be changed to allow earlier deployment if an added mass at a predetermined location is determined in steps 114. The amount of compensation will likely be determined experimentally based on the vehicle configuration.

If the vehicle has a significant amount of loading, i.e., the calculated loading exceeds a threshold $P_{max}$ $$\Delta M \geq P_{max} \tag{38}$$

and at the same time the longitudinal distance of the mass exceeds another threshold $L_{max}$.

$$L \geq L_{max} \tag{39}$$

then the vehicle is more prone to oversteer. In this case, the yaw stability control gains and the sideslip angle control gains need to be increased in order to have early activation so as to prevent the vehicle from getting into uncontrollable and unstable dynamics. Control gains are set top the value $G_{TLMAX}$, which are tuned for large trunk loading.

If the vehicle has a significant loading, i.e., $\Delta M \geq P_{max}$, but the loading is not at the vehicle trunk, that is, the longitudinal distance of the loading is smaller than a lower threshold $L_{min}$ $$L \leq L_{min} \tag{40}$$

all the gains for the feedback control used for commanding the actuators are set to a set of values $G_{NTLMAX}$ tuned for large non-trunk loadings.

If the vehicle has a significant loading, i.e., $\Delta M \geq P_{max}$, but the loading distance is between the trunk distance and zero, i.e., L is between a lower threshold $L_{min}$ (possibly zero) and the high threshold $L_{max}$, $$L_{min} \leq L \leq L_{max} \tag{41}$$

all the gains for the feedback control used for commanding the actuators are set to the following values adjusted based on the detected loading height as in the following $$G_L = G_{NTLMAX} + \frac{L - L_{min}}{L_{max} - L_{min}}(G_{TLMAX} - G_{NTLMAX}) \tag{42}$$

If the vehicle has a loading which is below the maximum allowed loading $P_{max}$ but above the lower bound of a valid trunk loading $P_{min}$, i.e., $$P_{min} \leq \Delta M \leq P_{max} \quad (43)$$

Assume all the nominal gains for feedback (for the vehicle with nominal loading) are denoted as $G_{nom}$, then the control gains will be adjusted based on the detected loading as in the following $$G_{\Delta M} = G_{nom} + \frac{\Delta M - P_{min}}{P_{max} - P_{min}}(G_{TLMAX} - G_{nom}) \quad (44)$$

The pitch gradient itself can also be directly used to adjust control gains. If the vehicle has a significant increase of pitch gradient, i.e., $\rho \geq \rho_{min}$, then all the gains for the feedback control used for commanding the actuators are set to the following values adjusted based on the detected pitch gradient as in the following $$G_\rho = G_{\rho MIN} + \frac{\rho - \rho_{min}}{\rho_{max} - \rho_{min}}(G_{\rho MAX} - G_{\rho MIN}) \quad (45)$$

where $\rho_{min}$ is the pitch gradient corresponding to a vehicle without trunk loading and $\rho_{max}$ is the pitch gradient corresponding to the vehicle with maximum trunk loading allowed.

Notice that the control gain adjustments other than the above listed linear interpolation methods are possible. Also, notice that the dead-bands and thresholds used in stability feedback control can also be similarly adjusted based on the loading distance L and/or the loading $\Delta M$, or the pitch gradient, or the pitch moment of inertia calculated as in (32).

With the added trunk loading, the front and rear normal loadings can be calculated as $$N_f = N_{f0} + \frac{L_0 \Delta M + \Delta LM + \Delta LM}{b}g$$
$$N_r = N_{r0} + \Delta Mg - \frac{L_0 \Delta M + \Delta LM + \Delta LM}{b}g \quad (46)$$

where b is the vehicle base, $N_{f0}, N_{r0}$ are nominal normal loadings at the front and rear axle when vehicle does not have trunk loading, $L_0$ is the distance from the nominal c.g. of the vehicle to the rear axle. The nominal loading generated pitch misalignment of the vehicle can be calculated as $$\varphi_{LPM0} = \frac{1}{2b}\left(\frac{N_{f0}}{K_f} - \frac{N_{r0}}{K_r}\right) \quad (47)$$

where $K_f, K_r$ are the vertical suspension rates for the front and rear axles. For a well-tuned vehicle, such a nominal loading induced pitch misalignment is usually zero, i.e., $\phi_{LPM0}=0$.

The load induced pitch misalignment caused by the trunk loading can be similarly computed as $$\varphi_{LPM} = \frac{1}{2b}\left(\frac{N_f}{K_f} - \frac{N_r}{K_r}\right) \quad (48)$$

In 74, the deviation $\Delta \phi_{LPM}$ between $\phi_{LPM0}$ and $\phi_{LPM}$ can be used to correct the sensor readings as in the following $$\omega_{xcorrected} = \omega_x \cos(\Delta\phi_{LPM}) - \omega_z \sin(\Delta\omega_{LPM})$$

$$\omega_{zcorrected} = \omega_x \sin(\Delta\phi_{LPM}) + \omega_z \cos(\Delta\omega_{LPM})$$

$$a_{xcorrected} = a_x \cos(\Delta\phi_{LPM}) - a_z \sin(\Delta\omega_{LPM})$$

$$a_{zcorrected} = a_x \sin(\Delta\phi_{LPM}) + a_z \cos(\Delta\omega_{LPM}) \quad (49)$$

where $\omega_{xcorrected}, \omega_{zcorrected}, a_{xcorrected}, a_{xcorrected}$ are the corrected roll rate, yaw rate, longitudinal acceleration and vertical acceleration respectively. Notice that from (49), if the vehicle is only yawing without rolling, the roll rate sensor mounted on the vehicle could still have roll rate output.

The above calculated loading induced pitch misalignment can be fed into 70, 72 to achieve the desired control functions.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling a vehicle system for a vehicle comprising:
    determining a pitch gradient;
    determining a pitch acceleration coefficient;
    determining an added mass and a position of the added mass from the pitch gradient and the pitch acceleration coefficient; and
    controlling the vehicle system in response to the added mass and position of the added mass.

2. A method as recited in claim 1 wherein determining a pitch gradient comprises determining a pitch gradient from a pitch rate sensor signal.

3. A method as recited in claim 1 wherein determining a pitch acceleration coefficient comprises determining a pitch acceleration coefficient from a pitch rate sensor signal.

4. A method as recited in claim 1 wherein the position corresponds to a change in a center of gravity position.

5. A method as recited in claim 1 wherein controlling the vehicle system comprises controlling a safety system.

6. A method as recited in claim 5 wherein controlling the safety system comprises controlling a roll stability control system.

7. A method as recited in claim 5 wherein controlling the safety system comprises controlling a yaw stability control system.

8. A method as recited in claim 1 wherein controlling the vehicle system comprises controlling a headlight leveling system.

9. A method as recited in claim 1 wherein controlling the vehicle system comprises controlling vehicle body leveling system.

10. A method as recited in claim 1 wherein controlling the vehicle system comprises compensating at least one sensor output.

11. A method as recited in claim 1 wherein determining a pitch gradient comprises determining the pitch gradient in response to a pitch rate signal and a longitudinal acceleration signal.

12. A method as recited in claim 1 wherein determining a pitch gradient comprises determining the pitch gradient in response to a longitudinal acceleration signal, a pitch rate signal and a pitch acceleration signal.

13. A method as recited in claim 1 wherein determining a pitch gradient comprises determining the pitch gradient in response to a longitudinal acceleration signal, a yaw rate signal and a pitch rate signal.

14. A method as recited in claim 1 wherein determining a pitch gradient comprises determining the pitch gradient in response to a longitudinal acceleration signal, a pitch rate signal, a pitch acceleration signal and a yaw rate signal.

15. A method as recited in claim 1 wherein determining a pitch gradient comprises determining the pitch gradient in response to a longitudinal acceleration signal, a pitch rate signal, a pitch acceleration signal, a yaw rate signal and a relative roll angle.

16. A method as recited in claim 1 wherein determining a pitch acceleration coefficient comprises determining the pitch acceleration coefficient in response to a pitch rate signal and a longitudinal acceleration signal.

17. A method as recited in claim 1 wherein determining a pitch acceleration coefficient comprises determining the pitch acceleration coefficient in response to a longitudinal acceleration signal, a pitch rate and a pitch acceleration signal.

18. A method as recited in claim 1 wherein determining a pitch acceleration coefficient comprises determining the pitch acceleration coefficient in response to a longitudinal acceleration signal, a yaw rate signal and a pitch rate signal.

19. A method as recited in claim 1 wherein determining a pitch acceleration coefficient comprises determining the pitch acceleration coefficient in response to a longitudinal acceleration signal, a pitch rate signal, a pitch acceleration signal and a yaw rate signal.

20. A method as recited in claim 1 wherein determining a pitch acceleration coefficient comprises determining the pitch acceleration coefficient in response to a longitudinal acceleration signal, a pitch rate signal, a pitch acceleration signal, a yaw rate signal and a relative roll angle.

21. A method for controlling a vehicle system for a vehicle comprising:
sensing a pitch rate;
sensing a longitudinal acceleration;
sensing a yaw rate;
determining an input representative of added mass and a position of the added mass from the sensed pitch rate, the sensed longitudinal acceleration and the sensed yaw rate; and
controlling the vehicle system in response to the input representative of added mass and the position of the added mass.

22. A method as recited in claim 21 wherein controlling the vehicle system comprises controlling a safety system.

23. A method as recited in claim 22 wherein controlling the safety system comprises controlling a roll stability control system.

24. A method as recited in claim 22 wherein controlling the safety system comprises controlling a yaw stability control system.

25. A method as recited in claim 21 wherein controlling the vehicle system comprises controlling a headlight leveling system.

26. A method as recited in claim 21 wherein controlling the vehicle system comprises controlling vehicle body leveling system.

27. A method as recited in claim 21 wherein controlling the vehicle system comprises compensating at least one sensor output.

* * * * *